(12) United States Patent
Zobel et al.

(10) Patent No.: US 12,158,390 B2
(45) Date of Patent: Dec. 3, 2024

(54) METHOD AND COMPUTING DEVICE FOR OPERATING A CONTROL UNIT FOR AN EXHAUST GAS SENSOR

(71) Applicant: Robert Bosch GmbH, Stuttgart (DE)

(72) Inventors: Tobias-Gerhard Zobel, Stuttgart (DE); Bernhard Ledermann, Weil der Stadt (DE); Claudius Bevot, Stuttgart (DE); Florian Mezger, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 292 days.

(21) Appl. No.: 17/632,428

(22) PCT Filed: Jul. 23, 2020

(86) PCT No.: PCT/EP2020/070759
§ 371 (c)(1),
(2) Date: Feb. 2, 2022

(87) PCT Pub. No.: WO2021/037449
PCT Pub. Date: Mar. 4, 2021

(65) Prior Publication Data
US 2022/0276127 A1    Sep. 1, 2022

(30) Foreign Application Priority Data
Aug. 30, 2019   (DE) .................... 10 2019 213 116.6

(51) Int. Cl.
*F02D 41/14*     (2006.01)
*F02D 41/26*     (2006.01)
(Continued)

(52) U.S. Cl.
CPC ....... *G01M 15/104* (2013.01); *F02D 41/1454* (2013.01); *F02D 41/266* (2013.01); *F02D 2041/285* (2013.01); *F02D 2250/14* (2013.01)

(58) Field of Classification Search
CPC ...... F02D 41/14; F02D 41/1454; F02D 41/26; F02D 41/266; G01M 15/10; G01M 15/104
See application file for complete search history.

(56) References Cited

U.S. PATENT DOCUMENTS 4,376,431 A * 3/1983 Yokooku ............. F02D 41/0002
123/681
4,568,443 A * 2/1986 Asayama ............. G01N 27/417
204/410

(Continued)

FOREIGN PATENT DOCUMENTS

CN      1647003 A      7/2005
CN    105452636 A      3/2016
(Continued)

OTHER PUBLICATIONS

DE 102008911697 English Translation Version.*
(Continued)

*Primary Examiner* — Hai H Huynh
*Assistant Examiner* — Johnny H Hoang
(74) *Attorney, Agent, or Firm* — NORTON ROSE FULBRIGHT US LLP; Gerard A. Messina

(57) ABSTRACT

A method for operating a control unit for an exhaust gas sensor, in particular for a broadband lambda sensor for an internal combustion engine, in particular, of a motor vehicle, or for another sensor device. The control unit is designed to electrically activate the exhaust gas sensor. The control unit is, in particular, implemented in the form of an application-specific integrated circuit (ASIC). The method includes: specifying a measuring sequence and/or a starting point in time, in particular, for an operation of the control unit and/or of the exhaust gas sensor, with the aid of a computing device.

15 Claims, 7 Drawing Sheets

(51) Int. Cl.
 *G01M 15/10*   (2006.01)
 *F02D 41/28*   (2006.01)

(56) References Cited

U.S. PATENT DOCUMENTS

2015/0040876 A1* 2/2015 Cleeves ................. F02D 15/00
                                              123/90.15
2021/0231040 A1* 7/2021 Sundararajan ..... B01D 53/9427

FOREIGN PATENT DOCUMENTS

| CN | 107710753 A | 2/2018 |
| CN | 109634691 A | 4/2019 |
| DE | 102008001697 A1 | 11/2009 |
| WO | 2008145494 A1 | 12/2008 |

OTHER PUBLICATIONS

International Search Report for PCT/EP2020/070759, Issued Oct. 20, 2020.
Anonymous, "L9780-WIDE Range Air Fuel Sensor Control Interface," St Life Augmented, 2014, pp. 1-56. <https://www.st.com/resource/en/datasheet/19780.pdf> Downloaded Feb. 1, 2022.
Anonymous, "Automotive Electronics Product Information Lambda Probe Interface IC—CJ125," Bosch, 2006, pp. 1-7.
Knödler, "Lambda-Messwandler Version 4.X," Sebastian Knödler Technologie, 2015, pp. 1-53. <http://breitband-lambda.de/files/Doku%20V4.0%20(Stand%2028.12.2015).pdf>.

* cited by examiner

METHOD AND COMPUTING DEVICE FOR OPERATING A CONTROL UNIT FOR AN EXHAUST GAS SENSOR

FIELD

The present invention relates to a method for operating a control unit for an exhaust gas sensor, in particular for a broadband lambda sensor.

The present invention furthermore relates to a computing device for carrying out such a method.

SUMMARY

Preferred specific embodiments of the present invention relate to a method for operating a control unit for an exhaust gas sensor, in particular for a broadband lambda sensor for an internal combustion engine, in particular, of a motor vehicle, or for another sensor device, the control unit being designed to electrically activate the exhaust gas sensor or the sensor device, the control unit, in particular, being implemented in the form of an application-specific integrated circuit (ASIC), the method including: specifying a measuring sequence and/or a starting point in time, in particular, for an operation of the control unit and/or of the exhaust gas sensor or of the sensor device, with the aid of a computing device. In this way, increased flexibility is provided over conventional systems which, e.g., only provide an ASIC for the operation of the exhaust gas sensor or sensor device, since the computing device is able, e.g., to execute different computer programs and/or, in contrast to the conventional ASIC, may be efficiently (re)programmed, in general is even freely programmable, to change the operation of the exhaust gas sensor. Furthermore, a flexible operation of the control unit or sensor device is made possible as a result of the specification of the measuring sequence and/or of the starting point in time.

The principle according to the preferred specific embodiments is not limited to exhaust gas sensors or control units for exhaust gas sensors, but may also be applied to control units for other sensor devices. However, for the sake of clarity, the following description refers to exhaust gas sensors and control units for exhaust gas sensors by way of example. The described preferred specific embodiments, aspects and advantages may accordingly also be applied to control units for other sensor devices and their operation.

In further preferred specific embodiments of the present invention, it is provided that the method furthermore includes: specifying at least one transfer point in time for a data transfer from the control unit to the computing unit. In this way, it may be established with the aid of the preferably free programmable computing device when the data transfer (s) from the control unit to the processing unit is/are to take place.

In further preferred specific embodiments of the present invention, it is provided that the computing device exchanges data with the control unit via a, preferably bidirectional, in particular, serial, data link, in particular of the serial peripheral interface (SPI) type, the computing device providing a synchronization signal for the control unit with the aid of the data link.

An SPI interface includes, for example, four data lines and associated signals: 1. SCLK or SCK, is output, e.g., by a master for synchronization; 2. MOSI (master output, slave input), e.g., for the data transfer from master to slave; 3. MISO (master input, slave output), e.g., for the data transfer from slave to master; 4. chip select (CS), e.g., for selecting a slave.

In further preferred specific embodiments of the present invention, it is provided that the computing device uses a or the chip select (CS) line, or a CS signal of the data link, in particular, of the SPI data link or SPI interface, to provide the synchronization signal for the control unit. It was recognized that the CS signal is advantageously usable for the efficient synchronization of one or multiple control unit(s) connected to the computing device.

In further preferred specific embodiments of the present invention, it is provided that the computing device includes at least one processing unit for executing at least one computer program, which is, in particular, designed to at least temporarily control an operation of the control unit and/or of the exhaust gas sensor and/or to carry out at least one of the following elements: a) specifying the measuring sequence and/or the starting point in time; b) specifying the at least one transfer point in time; c) providing a or the synchronization signal, e.g., CS signal, for the control unit.

In further preferred specific embodiments of the present invention, it is provided that the computing device at least partially implements a sequencer for an operation of the exhaust gas sensor and/or of the control unit, the sequencer, in particular, being at least partially specified with the aid of at least one computer program or with the aid of the at least one computer program.

In further preferred specific embodiments of the present invention, it is provided that the computing device at least partially implements a primary sequencer for an operation of the exhaust gas sensor, a secondary sequencer of the control unit, in particular, being controlled with the aid of the primary sequencer.

Further preferred specific embodiments of the present invention relate to a computing device for carrying out the method according to the specific embodiments.

In further preferred specific embodiments of the present invention, it is provided that the computing device includes at least one processing unit, at least one memory unit assigned to the processing unit for at least temporarily storing a computer program and/or data (e.g., data for a sequencer of the operation of the exhaust gas sensor), the computer program, in particular, being designed to carry out one or multiple step(s) of the method according to the specific embodiments.

In further preferred specific embodiments of the present invention, the processing unit includes at least one of the following elements: a microprocessor, a microcontroller, a digital signal processor (DSP), a programmable logic module (e.g., field programmable gate array (FPGA)), at least one processor core. Combinations thereof are also possible in further preferred specific embodiments.

In further preferred specific embodiments of the present invention, the memory unit includes at least one of the following elements: a volatile memory, in particular, a working memory (RAM), a non-volatile memory, in particular, a flash EEPROM.

Further preferred specific embodiments of the present invention relate to a computer program (product), encompassing commands which, during the execution of the computer program by a computer, e.g., the aforementioned processing unit, prompt the computer to carry out the method according to the specific embodiments.

Further preferred specific embodiments of the present invention relate to a computer-readable memory medium, encompassing commands, in particular in the form of a computer program, which, during the execution by a computer, prompt the computer to carry out the method according to the specific embodiments.

Further preferred specific embodiments of the present invention relate to a data medium signal which characterizes and/or transfers the computer program according to the specific embodiments.

Further preferred specific embodiments of the present invention relate to a control unit for an exhaust gas sensor, the control unit being designed to electrically activate the exhaust gas sensor, the control unit, in particular, being implemented in the form of an application-specific integrated circuit (ASIC), the control unit being designed to carry out the following steps: receiving at least one of the following elements from a computing device, in particular, the computing device according to the specific embodiments: a) a measuring sequence and/or a starting point in time, in particular for an operation of the control unit and/or of the exhaust gas sensor; b) at least one transfer point in time for a data transfer from the control unit to the computing device; and c) a synchronization signal for the control unit.

In further preferred specific embodiments of the present invention, it is provided that the control unit is designed to carry out or change its operation as a function of the measuring sequence and/or of the starting point in time and/or of the transfer point in time and/or of the synchronization signal, the control unit, in particular, being designed to synchronize its operation using the synchronization signal.

Additional features, application options and advantages of the present invention are derived from the following description of exemplary embodiments of the present invention, which are shown in the figures. All described or illustrated features, either alone or in any arbitrary combination, form the subject matter of the present invention, regardless of the wording or representation thereof in the description or in the figures.

DETAILED DESCRIPTION OF EXAMPLE EMBODIMENTS

Figure 1:
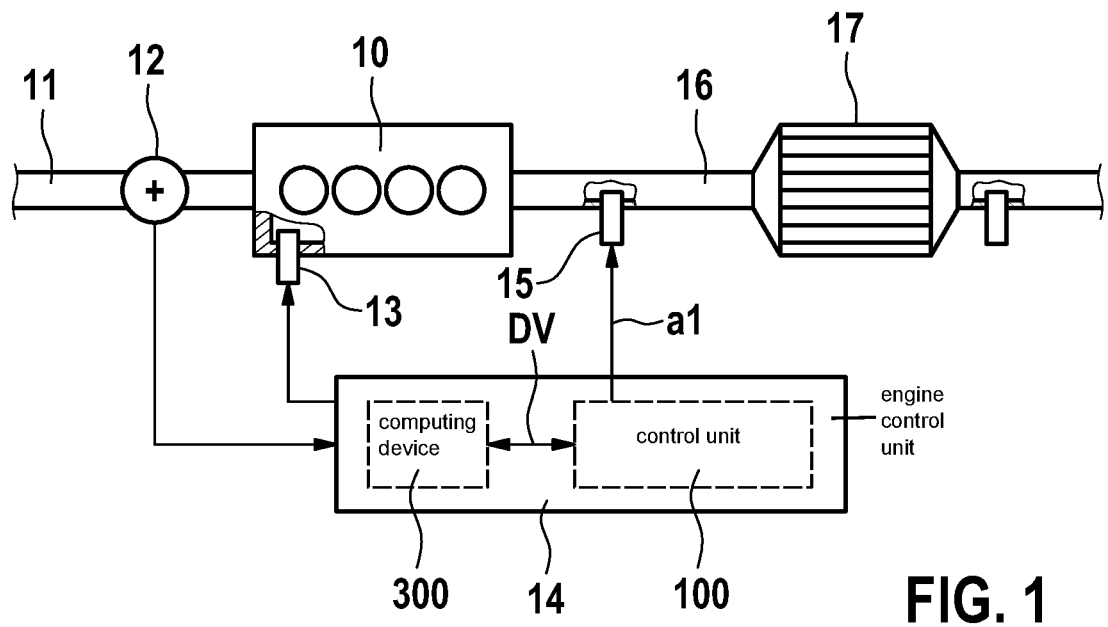
FIG. 1 schematically shows a simplified block diagram of an internal combustion engine in which the method according to preferred specific embodiments of the present invention may be applied.

FIG. 1 schematically shows the technical surroundings in which the method according to preferred specific embodiments may be used based on one example of a gasoline engine. An internal combustion engine 10 is supplied with air via an air supply unit 11, and its mass is determined with the aid of a mass air flow sensor 12. Mass air flow sensor 12 may be designed as a hot film mass air flow sensor. The exhaust gas of internal combustion engine 10 is discharged via an exhaust gas channel 16, an emission control system 17 being provided downstream from internal combustion engine 10 in the flow direction of the exhaust gas. An engine control unit 14 is provided for controlling internal combustion engine 10, which, on the one hand, controls the amount of fuel supplied to internal combustion engine 10 via a fuel metering unit 13 and to which, on the other hand, signals of mass air flow sensor 12 and of an exhaust gas sensor 15 situated in exhaust gas channel 16, e.g., upstream from emission control system 17, are supplied. Exhaust gas sensor 15 determines an actual lambda value of a fuel-air mixture supplied to internal combustion engine 10 and may, e.g., form a part of a lambda control loop assigned to internal combustion engine 10. Exhaust gas sensor 15 may, e.g., be configured as a broadband lambda sensor.

In preferred specific embodiments, a control unit 100 is provided for the operation of exhaust gas sensor 15, which is, in particular, designed to electrically activate al exhaust gas sensor 15 or components of exhaust gas sensor 15. For example, control unit 100 may be designed in the form of an ASIC and, e.g., be integrated into engine control unit 14.

Figure 3A:
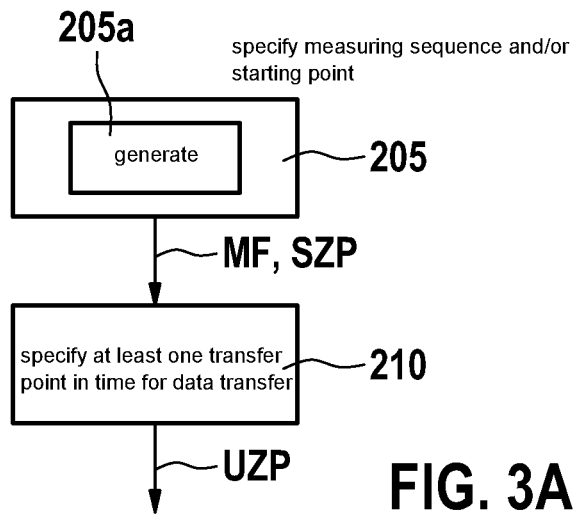
FIG. 3A schematically shows a simplified flowchart of a method according to further preferred specific embodiments of the present invention.

Further preferred specific embodiments relate to a method for operating control unit 100 for exhaust gas sensor 15, the method, see FIG. 3A, including: specifying 205 a measuring sequence MF and/or a starting point in time SZP, in particular, for an operation of control unit 100 (FIG. 1) and/or of exhaust gas sensor 15, with the aid of a computing device 300 (FIG. 1). In this way, increased flexibility is provided compared to conventional systems which, for example, only provide an ASIC for the operation of the exhaust gas sensor 15, since computing device 300 (FIG. 1) is able, for example, to execute different computer programs and/or, in contrast to the conventional ASIC, may be efficiently (re)programmed, in general is even freely programmable, to change the operation of exhaust gas sensor 15. The principle according to preferred specific embodiments is not limited to exhaust gas sensors 15 or control units 100 for exhaust gas sensors 15, but may also be applied to control units for other sensor devices (not shown). However, for the sake of clarity, the following description refers to exhaust gas sensors 15 and control units 100 for such exhaust gas sensors 15 by way of example.

In further preferred specific embodiments, computing device 300 is also integrated into engine control unit 14.

In further preferred specific embodiments, it is provided that the method, see FIG. 3A, furthermore includes: specifying 210 at least one transfer point in time UZP for a data transfer from control unit 100 to processing unit 300. In this way, it may be established with the aid of the preferably free programmable computing device 300 when data transfer(s) from the control unit to the processing unit is/are to take place.

In further preferred specific embodiments, it may be provided that elements MF, SZP are generated, e.g., with the aid of computing device 300 or a computer program running thereon; see step 205a of FIG. 3A.

Figure 3B:
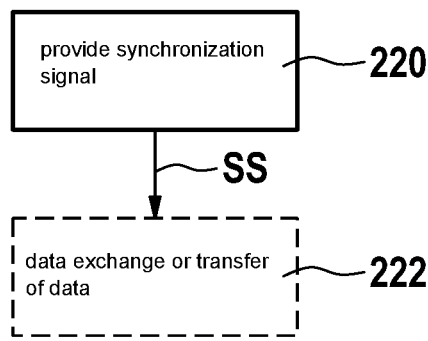
FIG. 3B schematically shows a simplified flowchart of a method according to further preferred specific embodiments of the present invention.

In further preferred specific embodiments, it is provided that computing device 300 exchanges data with control unit 100 via a, preferably bidirectional, in particular, serial, data link DV (FIG. 1), in particular of the serial peripheral interface (SPI) type, computing device 300 providing a synchronization signal for control unit 100 with the aid of data link DV. In this way, an operation of control unit 100 may be efficiently synchronized with the operation of computing device 300. FIG. 3B illustrates this by way of example. In step 220, computing device 300 provides synchronization signal SS for control unit 100, and in optional step 222, an operation of control unit 100 which is synchronized with computing device 300 takes place, which, e.g., may also encompass a data exchange or a transfer of data from control unit 100 to computing device 300.

In further preferred specific embodiments, it is provided that computing device 300 uses a chip select (CS) line, or a CS signal of data link DV (FIG. 1), in particular, of the SPI data link or SPI interface, to provide synchronization signal SS (FIG. 3B) for control unit 100.

Figure 2:
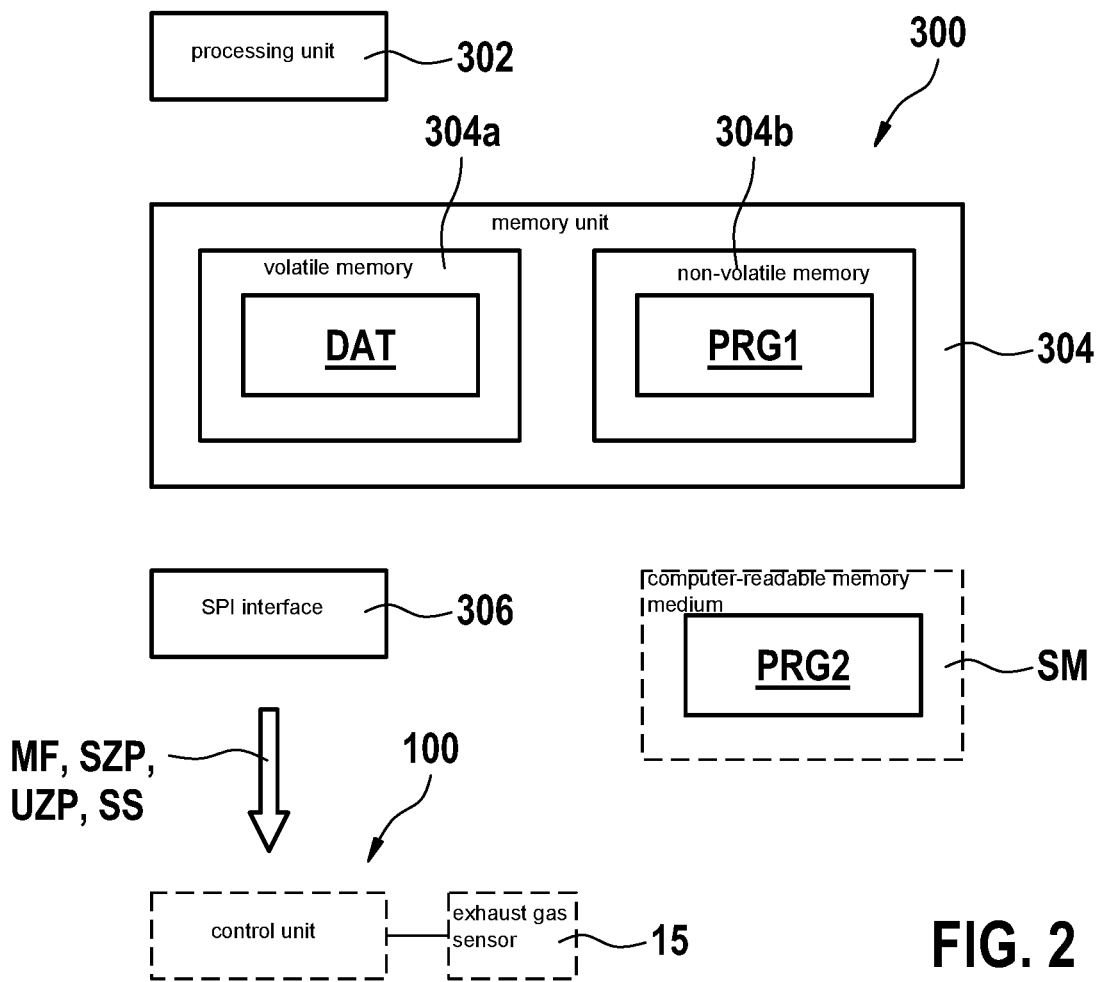
FIG. 2 schematically shows a simplified block diagram of a computing device according to further preferred specific embodiments of the present invention.

In further preferred specific embodiments, see FIG. 2, it is provided that computing device 300 includes at least one processing unit 302 for executing at least one computer program PRG1, PRG2, which is, in particular, designed to at least temporarily control an operation of control unit 100 and/or of exhaust gas sensor 15 and/or to carry out at least one of the following elements: a) specifying 205 (see also FIG. 3A) measuring sequence MF and/or starting point in time SZP; b) specifying the at least one transfer point in time UZP; and c) providing 220 (FIG. 3B) a or the synchronization signal SS, e.g., CS signal, for control unit 100.

In further preferred specific embodiments, it is provided that computing device 300 (FIG. 2) at least partially implements a sequencer for an operation of exhaust gas sensor 15 and/or of control unit 100, the sequencer, in particular, being at least partially specified with the aid of the at least one computer program PRG1, PRG2.

In further preferred specific embodiments, it is provided that computing device 300 includes at least one memory unit 304 assigned to processing unit 302 for at least temporarily storing a computer program PRG1 and/or data DAT (e.g., data for the sequencer of the operation of exhaust gas sensor 15), computer program PRG1, in particular, being designed to carry out one or multiple step(s) of the method according to the specific embodiments.

In further preferred specific embodiments, processing unit 302 includes at least one of the following elements: a microprocessor, a microcontroller, a digital signal processor (DSP), a programmable logic module (e.g., field programmable gate array (FPGA)), at least one processor core. Combinations thereof are also possible in further preferred specific embodiments.

In further preferred specific embodiments, memory unit 304 includes at least one of the following elements: a volatile memory 304a, in particular, a working memory (RAM), a non-volatile memory 304b, in particular, a flash EEPROM.

Further preferred specific embodiments relate to a computer program (product) PRG1, PRG2, encompassing commands which, during the execution of computer program PRG1, PRG2 by a computer, e.g., the aforementioned processing unit 302, prompt the computer to carry out the method according to the specific embodiments.

Further preferred specific embodiments relate to an optional computer-readable memory medium SM, encompassing commands, in particular in the form of a computer program PRG2, which, during the execution by a computer 302, prompt the computer to carry out the method according to the specific embodiments.

Further preferred specific embodiments relate to a data medium signal which characterizes and/or transfers the computer program PRG1, PRG2 according to the specific embodiments.

In further preferred specific embodiments, computing device 300 includes an SPI interface 306 or an SPI interface module (SPI module) for implementing the bidirectional data link DV (FIG. 1) to control unit 100. Preferably, a chip select signal of SPI interface 306 may be used to provide 220 (FIG. 3B) synchronization signal SS.

Figure 3C:
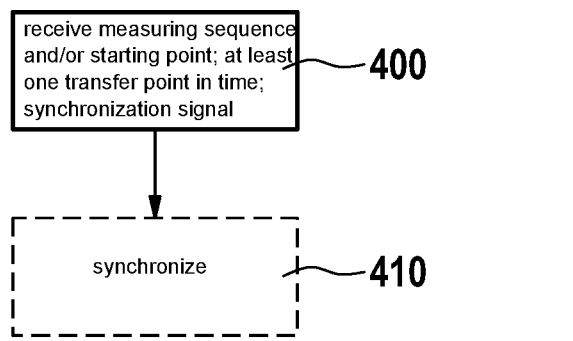
FIG. 3C schematically shows a simplified flowchart of a method according to further preferred specific embodiments of the present invention.

Further preferred specific embodiments relate to a control unit 100 (FIG. 1) for an exhaust gas sensor 15 or generally for a sensor device, control unit 100 being designed to electrically activate al exhaust gas sensor 15, control unit 100, in particular, being implemented in the form of an application-specific integrated circuit (ASIC), control unit 100 being designed to carry out the following steps, see FIG. 3C: receiving 400 at least one of the following elements from a computing device 300 (FIGS. 1, 2), in particular, computing device 300 according to the specific embodiments: a) a measuring sequence MF and/or starting point in time SZP, in particular for an operation of control unit 100 and/or of exhaust gas sensor 15; b) at least one transfer point in time UZP for a data transfer from control unit 100 to computing device 300; and c) a synchronization signal SS for control unit 100.

In further preferred specific embodiments, see FIG. 3C, it is provided that control unit 100 is designed to carry out or change its operation as a function of measuring sequence MF and/or of starting point in time SZP and/or of transfer point in time UZP and/or of synchronization signal SS, see step 410 from FIG. 3C, control unit 100, in particular, being designed to synchronize its operation 410 with synchronization signal SS (FIG. 3B).

In further preferred specific embodiments, SPI module 306 is compatible with the SPI standard; in further preferred specific embodiments, however, it may optionally be optimized for control unit 100 in its transfer length and/or a signal polarity as well as the special function of the chip select signal. Preferably, a dedicated point-to-point link is providable between computing device 300 and control unit 100 with the aid of data link DV (FIG. 1). In further preferred specific embodiments, components having identical functions, i.e., e.g., multiple control units 100, may be connected in series (daisy chain) with the aid of data link DV.

Figure 4A:
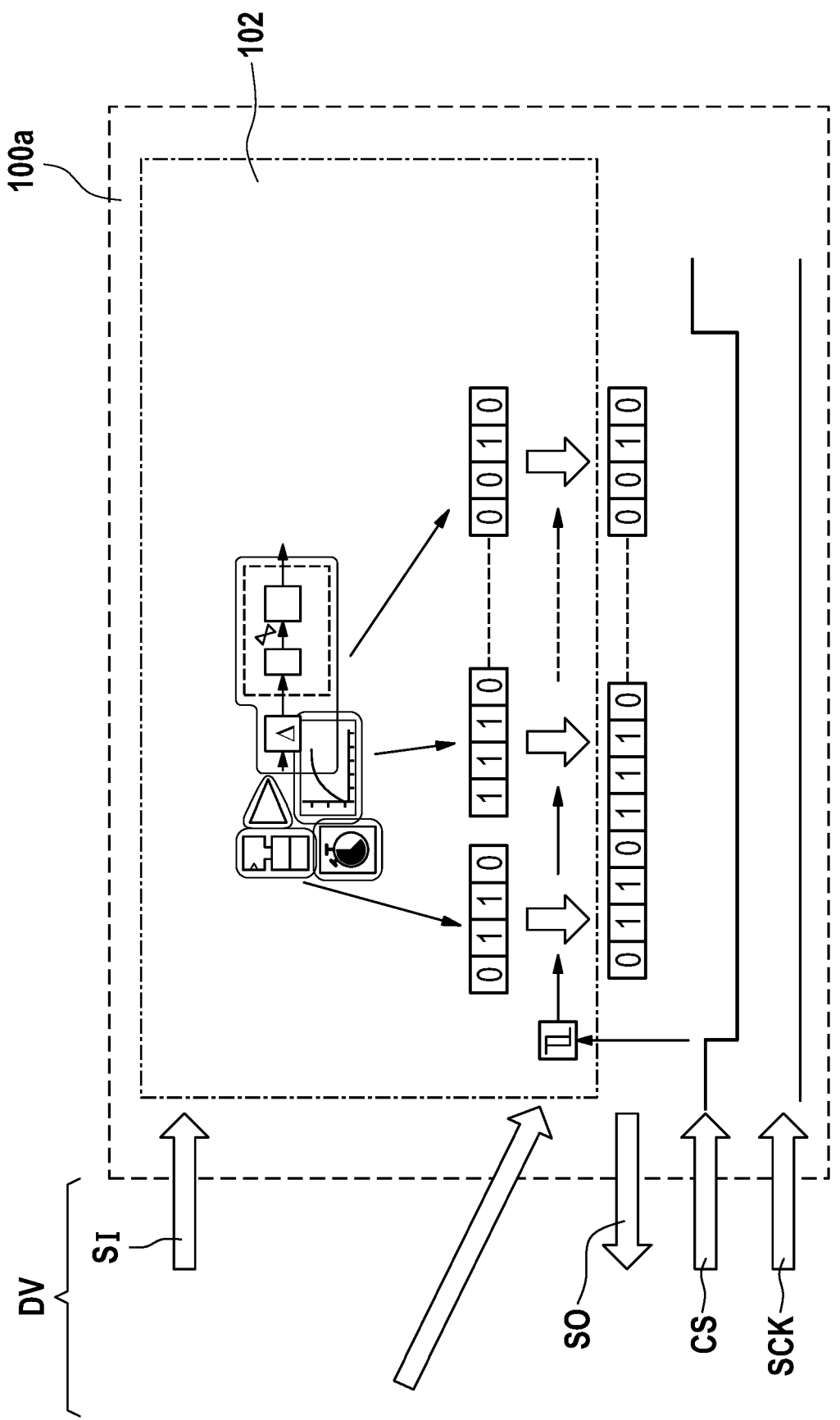
FIGS. 4A through 4E each schematically show a simplified block diagram according to further preferred specific embodiments of the present invention.

FIG. 4A schematically shows a simplified block diagram according to further preferred specific embodiments. Shown is a control unit 100a including a secondary sequencer 102 (low-level sequencer), which is at least temporarily controllable, e.g., by a (primary) sequencer implementable with the aid of computing device 300 (implemented, e.g., with the aid of computer program PRG1). The block arrows in FIG. 4A on the left symbolize individual lines or terminals or signals of SPI data link DV with the aid of which control unit 100a is able to exchange data with computing device 300.

In further preferred specific embodiments, SPI module 306 (FIG. 2) of computing device 300 is at least temporarily usable for at least one of the procedures listed below:

A) A transfer is started by the input of a defined signal level at chip select line CS (FIG. 4A) of SPI interface DV.
B) Thereupon, a uniform clock signal is output on a clock line SCK.
C) Using a defined edge of clock signal SCK, a bit of a value to be transferred is in each case output in a suitable order by SPI module 306 (FIG. 2) to a data line SO (FIG. 4A) (also referred to as "MOSI").

D) Using a defined edge of clock signal SCK, a bit of a value to be read is in each case read in by SPI module 306 (FIG. 2) from a data line SI (also referred to as "MISO").

E) A transfer is ended by the input of a defined signal level at chip select line CS.

In further preferred specific embodiments, data to be transferred via data link DV are, for example: measured values from a preceding measurement, e.g., a measured value of an analog-to-digital converter (not shown) of control unit 100, error information from a preceding event, e.g., the change in state of a comparator (not shown) of control unit 100, state information about a preceding state, e.g., a signal, which signals the orderly processing of the preceding measurement.

According to preferred specific embodiments, the CS signal of SPI data link DV is usable as a synchronization signal SS for control unit 100 or exhaust gas sensor 15 controllable thereby.

According to preferred specific embodiments, a, preferably unambiguously, described clock, measuring and/or time system, e.g., of low-level sequencer 102 of control unit 100*a* (FIG. 4A), may be triggered by a signal or level change of the CS signal and, e.g., be exactly synchronized. Further preferably, control unit 100*a* or its secondary sequencer 102 then passes through a fixedly defined sequence, e.g., to be able to carry out settings and thereafter start a measurement, whose sampling point is situated relative to the defined edge of the CS signal. In other words, as a result of the synchronization with computing device 300 with the aid of CS signal, an exact temporal relationship may be established between a time reference of computing device 300 and values ascertained or measured with the aid of control unit 100*a*.

Internal processes in control unit 100, 100*a* may preferably be triggered or started by a falling or rising edge of the CS signal, as a function of the definition. This ensures that settings and measurements in or by control unit 100, 100*a* always have a fixed temporal relationship with computing device 300. In this way, an "external" (based on computing device 300) measuring system 100, 100*a*, 15 may preferably be synchronized by the suitable generation of SPI CS signal SS.

In further preferred specific embodiments, it is provided that control unit 100, 100*a*, in particular due to the exclusive SPI connection DV, for the communication with computing device 300 only includes a single n-bit wide register for receiving and/or sending data, and additionally, e.g., does not require any further (working) memory.

In further preferred specific embodiments, the following advantages may be achieved by the exclusive SPI link DV (preferably at a high speed): a) individual measurements are possible; b) communication is simultaneous, synchronous during a transfer; b1) transfer of functionally relevant settings, in particular in the example of the control unit for exhaust gas sensor 15, the individual setting of the measuring and power switches necessary for a measurement, as well as the data for the power sources; b2) control of the measuring process, in particular in the example of the control unit for exhaust gas sensor 15, the triggering/synchronization of a measurement; b3) measured value and state transfer, in particular in the example of the control unit for exhaust gas sensor 15, the transfer of the measured value of a preceding measurement, together with pieces of error and monitoring information; c) considerable reduction of the time offset between measuring request and measuring result compared to conventional ASICs; d) functional system-related evaluation components (e.g., 2 control units for exhaust gas sensor 15) may be operated synchronously and in an approximately time-neutral manner at the same hardware lines DV; e) exact synchronization of control unit 100 for exhaust gas sensor 15 with, e.g., the clock of processing unit 302 (FIG. 2); f) no separate hardware line for signaling the end of measurement is required (e.g., an interrupt request (IRQ) line in conventional ASICs may be dispensed with); g) avoidance of frequency beats since the clock or synchronization signal SS comes from computing device 300; and h) reduction of the integrated complexity of control unit 100.

In further preferred specific embodiments, the data to be transferred between control unit 100, 100*a* and the computing device are defined in their bit position and the content. SPI module 306 is preferably designed in such a way that a data transfer from computing device 300 to control unit 100, 100*a* is possible in a short time (e.g., approximately 10 ρs transfer duration per control unit 100 to be activated).

Figure 4B:
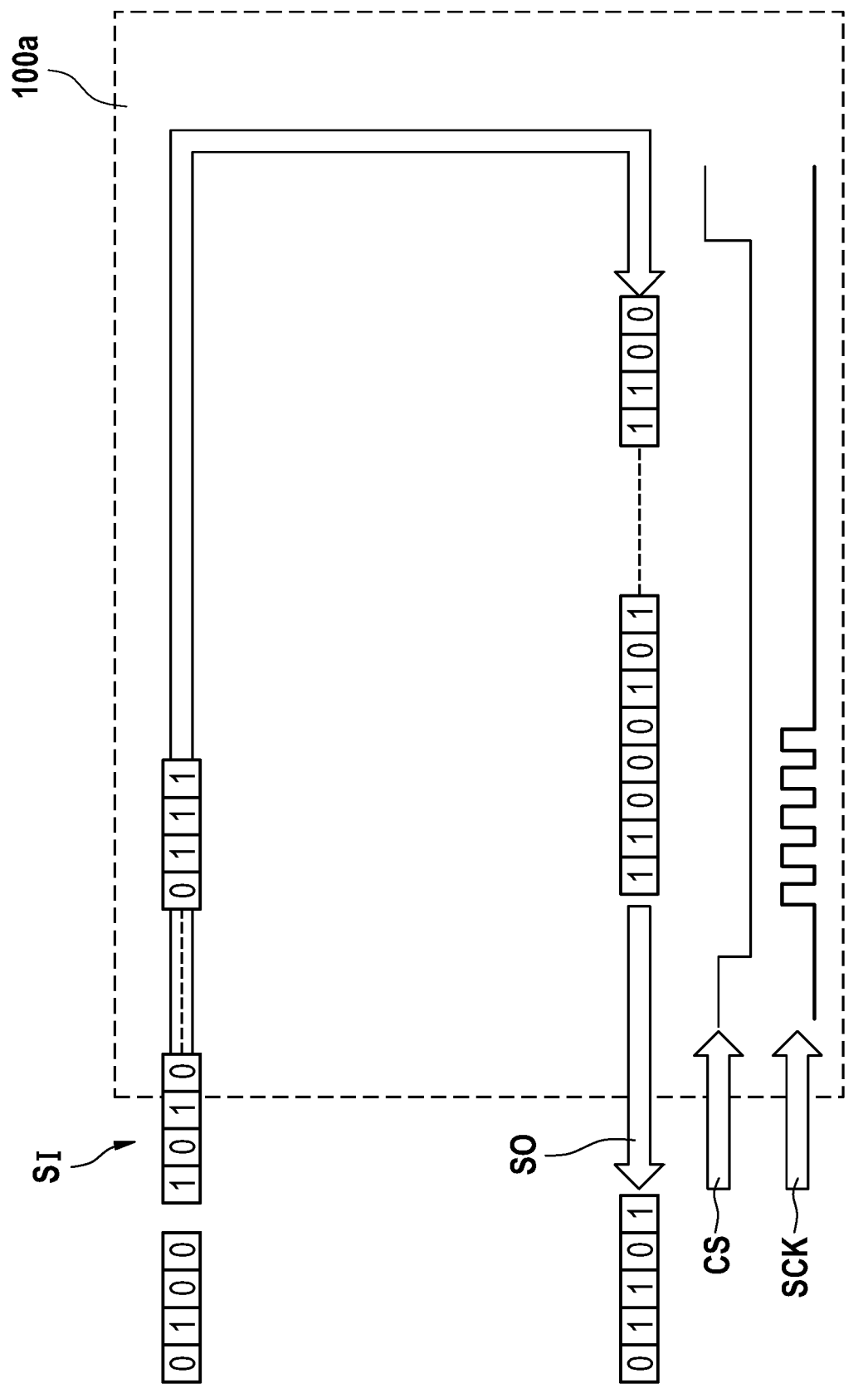

FIG. 4B schematically shows a simplified block diagram according to further preferred specific embodiments. This illustration is intended to show that, at a certain point in time after the chip select (CS) signal has assumed a defined state, the transfer of the data is carried out. In the process, data transferred into an SPI register of control unit 100*a* are output with the aid of signal SO and, at the same time, the data which are to be transferred from computing device 300 to control unit 100*a* are read in in the form of signal SI. The SPI register of control unit 100*a* may preferably be designed as a shifting register.

Figure 4C:
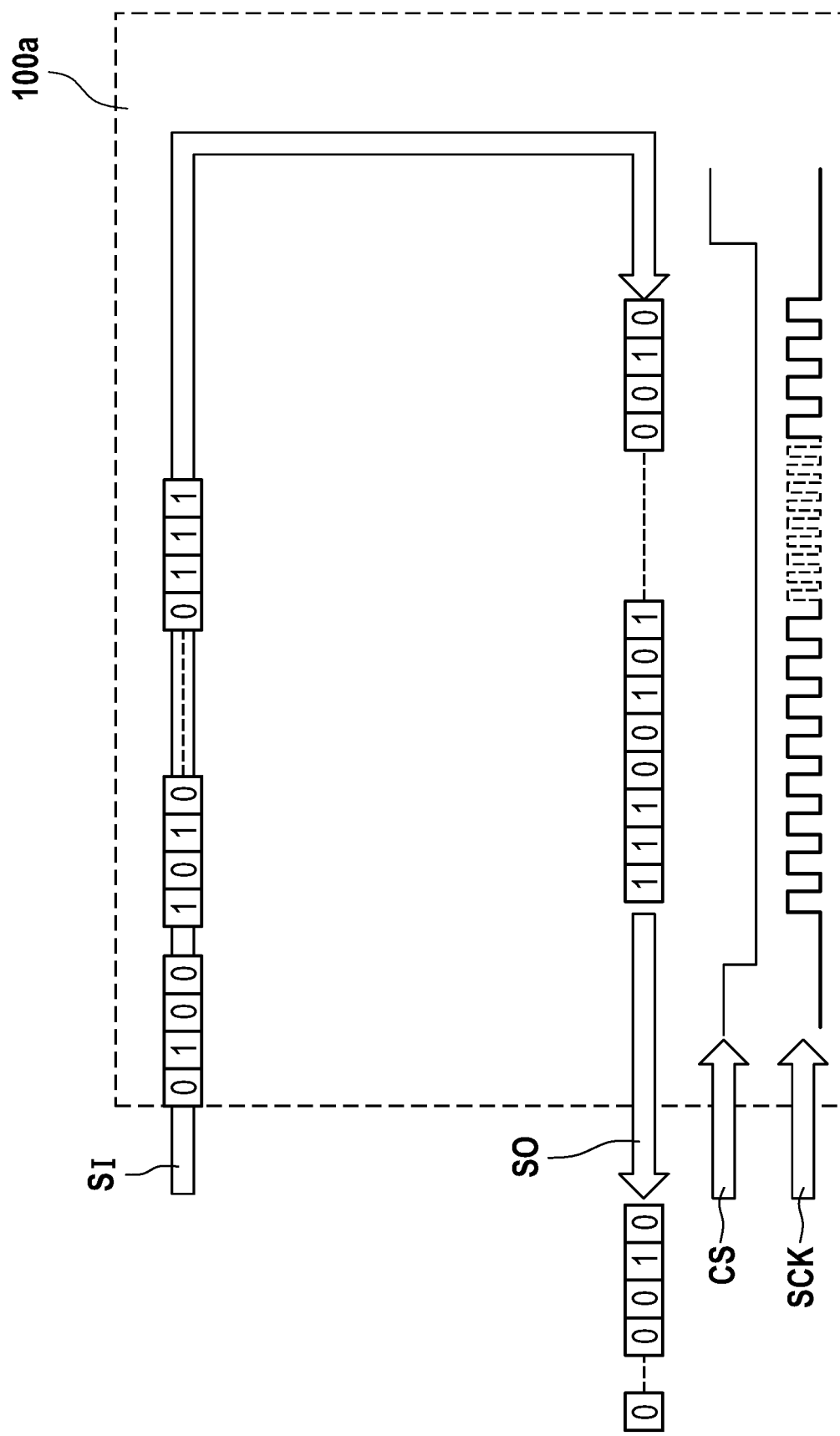

FIG. 4C schematically shows a simplified block diagram according to further preferred specific embodiments. This illustration is intended to show that the transfer is preferably at least n bits long. In the process, the data of the SPI register of control unit 100 are output with the aid of signal SO and, at the same time, data are read in by computing device 300 in the form of signal SI until all bits of the SPI register have been dealt with.

Figure 4D:
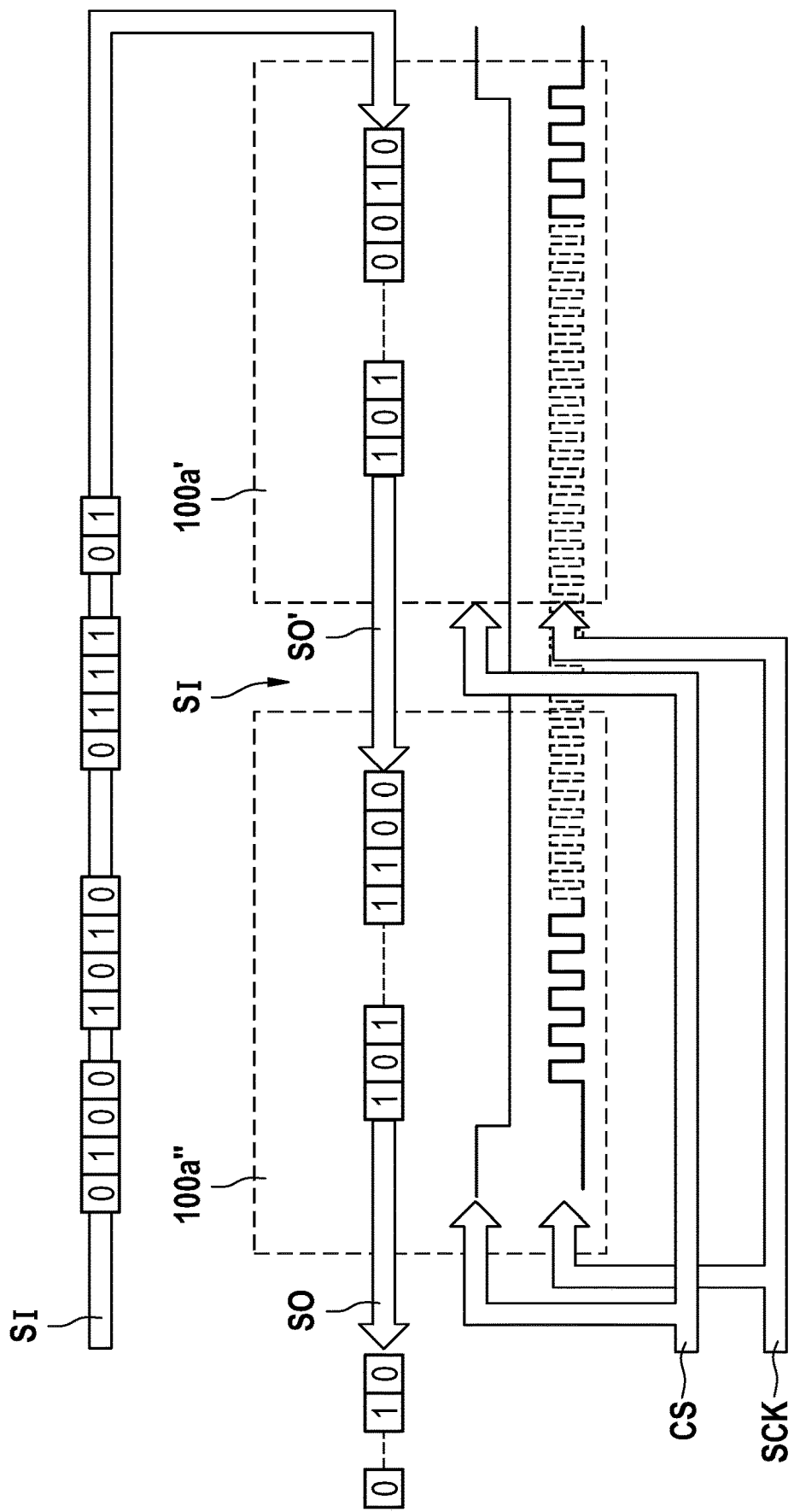

FIG. 4D schematically shows a simplified block diagram according to further preferred specific embodiments. This illustration is to show, by way of example, that the transfer may be a multiple of n bits long. In the process, data of an SPI register of a control unit are output with the aid of signal SO and, at the same time, the data are read in in the form of signal SI until all bits of the SPI registers of the control unit(s) have been dealt with. When this is to take place, for example, for control units 100*a*', 100*a*" according to FIG. 4D, the number of transfer a', a" may be 2×n bits long. Control units 100*a*', 100*a*" are connected to one another in the process. The data of first control unit 100*a*', see signal SO', to be transferred are "pushed" through the SPI register of second control unit 100*a*", leading to signal SO. Computing device 300 is preferably designed to process both the received data and the data to be sent.

Further preferably, control units 100*a*', 100*a*" are connected in such a way that the "output" SO' of first control unit 100*a*' is connected to an "input" SI of second control unit 100*a*". First control unit 100*a*' is connected with its "input" SI to a corresponding output "MOSI" (not shown) of computing device 300 (FIG. 2). Second control unit 100*a*" is connected with its "output" SO to an input "MISO" (not shown) of computing device 300.

The chip select CS and SPI clock SCK signals are preferably present in parallel at the two control units 100*a*', 100*a*" and connected to corresponding pins (terminals) of computing device 300 (e.g., terminals CS, SCK of SPI interface 306). Chip select signal CS preferably remains at a previously defined level during an entire transfer. A defined edge of chip select signal CS preferably ends the transfer.

Figure 4E:
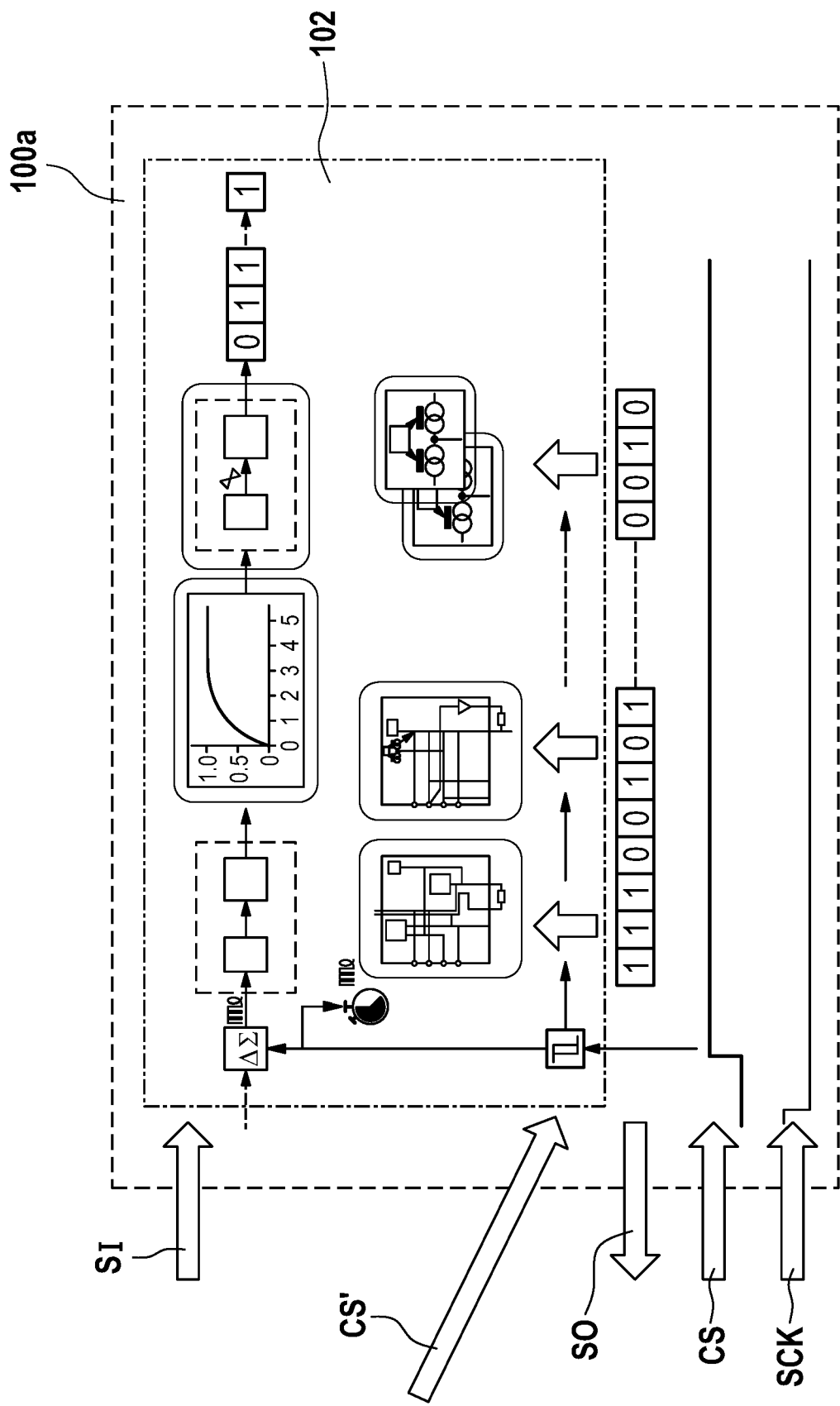

FIG. 4E schematically shows a simplified block diagram according to further preferred specific embodiments. This illustration is intended to show, by way of example, that internal processes are started in control unit 100$a$ with a defined edge of chip select signal CS, and therefore a synchronization of an operation of control unit 100$a$ is possible with the aid of chip select signal CS. This is additionally illustrated in FIG. 4E by block arrow CS'. In further preferred specific embodiments, the aforementioned internal processes of control unit 100$a$ describe, for example, that: a) a sequence of settings is started in control unit 100$a$; b) data are transferred from the SPI register of control unit 100$a$ to devices in control unit 100$a$ to be set; c) filters (e.g., of an ADC) may be preset; d) the time system of control unit 100$a$ is synchronized; e) a measurement may be started in control unit 100$a$; and f) the end of a transfer is identified.

Further advantages according to the preferred specific embodiments are listed hereafter: A) A sequencer in control unit 100, 100$a$ is at least partially, preferably completely, replaceable by a sequencer with the aid of computing device 300 and thus becomes freely programmable; B) the point in time of a transfer and the measurement are determined by computing device 300 and are thus flexibly settable; and C) individual measured values are transferred at high speed. In this way, the time between when a measurement is requested and the corresponding measured data are received may be reduced to less than 100 µs; D) no arithmetic unit is required in control unit 100, 100$a$; E) individual measured values may be transferred from control unit 100, 100$a$ to computing device 300 directly after their creation. In this way, no storage of measured values (and thus no RAM) is required in control unit 100, 100$a$; F) complex sequences may be processed in computing device 300, and control unit 100, 100$a$ may thus have a simpler design.

According to further aspects, it is also possible to create a control unit 100 (FIG. 1) having a freely programmable sequencer. As a result, the flexibility could be increased compared to the related art. In addition, a time offset between when the measurement is requested and the measured data are obtained could be influenced through the configuration of the sequencer. The resulting ASIC 100 may, e.g., be programmed during a control unit start of engine control unit 14 (FIG. 1).

What is claimed is:

1. A method for operating a control unit for an exhaust gas sensor for an internal combustion engine of a motor vehicle, the control unit being configured to electrically activate the exhaust gas sensor, the control unit implemented as an application-specific integrated circuit (ASIC), the method comprising:
   specifying to the control unit, using a computing device, at least one of: a measuring sequence for the control unit, a measuring sequence for the exhaust gas sensor, a starting point in time for an operation of the control unit, or a starting point in time for an operation of the exhaust gas sensor;
   exchanging data by the computing device with the control unit via a serial data link, the computing device providing a synchronization signal for the control unit using the data link, and the computing device using a chip select (CS) line or a CS signal of the data link to provide the synchronization signal for the control unit.

2. The method as recited in claim 1, wherein the exhaust gas sensor is a broadband lambda sensor.

3. The method as recited in claim 1, further comprising:
   specifying at least one transfer point in time for a data transfer from the control unit to the computing device.

4. The method as recited in claim 3, wherein the computing device includes at least one processing unit for executing at least one computer program which is configured to at least temporarily control an operation of the control unit and/or of the exhaust gas sensor and/or to carry out at least one of the following elements: a) specifying the measuring sequence and/or the starting point in time; b) specifying the at least one transfer point in time; and c) providing a synchronization signal for the control unit.

5. The method as recited in claim 1, wherein the serial data link is a bidirectional serial data line.

6. The method as recited in claim 1, wherein the serial data link is an SPI data link.

7. The method as recited in claim 1, wherein the computing device at least partially implements a sequencer for an operation of the exhaust gas sensor and/or of the control unit, the sequencer being at least partially specified using at least one computer program.

8. The method as recited in claim 1, wherein the computing device at least partially implements a primary sequencer for an operation of the exhaust gas sensor, a secondary sequencer of the control unit being controlled using the primary sequencer.

9. A computing device configured to operate a control unit for an exhaust gas sensor for an internal combustion engine of a motor vehicle, the control unit being configured to electrically activate the exhaust gas sensor, the control unit implemented as an application-specific integrated circuit (ASIC), the computing device configured to:
   specify to the control unit at least one of: a measuring sequence for the control unit, a measuring sequence for the exhaust gas sensor, a starting point in time for an operation of the control unit, or a starting point in time for an operation of the exhaust gas sensor; and
   exchange data by the computing device with the control unit via a serial data link, the computing device providing a synchronization signal for the control unit using the data link, and the computing device using a chip select (CS) line or a CS signal of the data link to provide the synchronization signal for the control unit.

10. A non-transitory computer-readable memory medium on which is stored a computer program for operating a control unit for an exhaust gas sensor for an internal combustion engine of a motor vehicle, the control unit being configured to electrically activate the exhaust gas sensor, the control unit implemented as an application-specific integrated circuit (ASIC), the computer program, when executed by a computer, causing the computer to perform the following:
   specifying to the control unit, using a computing device, at least one of: a measuring sequence for the control unit, a measuring sequence for the exhaust gas sensor, a starting point in time for an operation of the control unit, or a starting point in time for an operation of the exhaust gas sensor;
   exchanging data by the computing device with the control unit via a serial data link, the computing device providing a synchronization signal for the control unit using the data link, and the computing device using a chip select (CS) line or a CS signal of the data link to provide the synchronization signal for the control unit.

11. A method comprising:
    providing a data medium signal which characterizes and/or transfers a computer program for operating a control unit for an exhaust gas sensor for an internal combustion engine of a motor vehicle, the control unit being configured to electrically activate the exhaust gas sensor, the control unit implemented as an application-specific integrated circuit (ASIC), the computer program, when executed by a computer, causing the computer to perform the following:

specifying to the control unit, using a computing device, at least one of: a measuring sequence for the control unit, a measuring sequence for the exhaust gas sensor, a starting point in time for an operation of the control unit, or a starting point in time for an operation of the exhaust gas sensor;

exchanging data by the computing device with the control unit via a serial data link, the computing device providing a synchronization signal for the control unit using the data link, and the computing device using a chip select (CS) line or a CS signal of the data link to provide the synchronization signal for the control unit.

12. A control unit for an exhaust gas sensor for an internal combustion engine of a motor vehicle, the control unit being configured to electrically activate the exhaust gas sensor, the control unit being implemented as an application-specific integrated circuit (ASIC), the control unit being configured to:

receive from a computing device, at least one of: a measuring sequence for the control unit, a measuring sequence for the exhaust gas sensor, a starting point in time for an operation of the control unit, or a starting point in time for an operation of the exhaust gas sensor;

exchange data with the computing device via a serial data link, the control unit receiving a synchronization signal from the computing device using a chip select (CS) line or a CS signal of the data link.

13. The control unit as recited in claim 12, wherein the exhaust gas sensor is a broadband lambda sensor.

14. The control unit as recited in claim 12, wherein the control unit is configured to carry out or change its operation as a function of the at least one of: the measuring sequence for the control unit, the measuring sequence for the exhaust gas sensor, the starting point in time for the operation of the control unit, or the starting point in time for the operation of the exhaust gas sensor.

15. The control unit as recited in claim 12, wherein the control unit is configured to synchronize its operation with the synchronization signal.

* * * * *